United States Patent [19]

Savadogo et al.

[11] Patent Number: 5,298,343

[45] Date of Patent: Mar. 29, 1994

[54] ELECTROCATALYSTS FOR $H_2/O_2$ FUEL CELLS CATHODE

[75] Inventors: Oumarou Savadogo, Montreal; Abdeltif Essalik, St-Romuald, both of Canada

[73] Assignee: Ecole Polytechnique de Montreal, Montreal, Canada

[21] Appl. No.: 901,011

[22] Filed: Jun. 19, 1992

[51] Int. Cl.[5] .................... H01M 8/02; H01M 4/86; H01M 4/88
[52] U.S. Cl. ............................... 429/44; 429/42
[58] Field of Search ........................... 429/44

[56] References Cited

U.S. PATENT DOCUMENTS

| | | | |
|---|---|---|---|
| Re. 33,149 | 1/1990 | Petrow | 429/44 |
| 3,262,817 | 7/1966 | Thompson | 429/44 |
| 3,506,494 | 4/1970 | Adlhart | 136/86 |
| 3,514,340 | 5/1970 | Larson et al. | 429/44 |
| 4,192,907 | 3/1980 | Jalan et al. | 429/40 |
| 4,370,214 | 1/1983 | Kadija | 204/242 |
| 4,373,014 | 2/1983 | Landsman et al. | 429/13 |
| 4,513,094 | 4/1985 | Luczak | 502/101 |
| 4,591,578 | 5/1986 | Foley et al. | 502/185 |
| 4,808,563 | 2/1989 | Velenyi | 502/241 |
| 4,822,699 | 4/1989 | Wan | 429/40 |
| 4,826,795 | 5/1989 | Kitson et al. | 502/184 |
| 4,937,220 | 6/1990 | Nickols, Jr. | 502/185 |
| 5,183,713 | 2/1993 | Kunz | 429/44 |

Primary Examiner—David B. Springer
Attorney, Agent, or Firm—Oblon, Spivak, McClelland, Maier & Neustadt

[57] ABSTRACT

The invention relates to polycomponent electrocatalysts suitable for use at the cathode of electrochemical and fuel cells. More particularly, the invention relates to a polycomponent electrode comprising a catalytic electrode including a mixture of a metallic component including at least one metal selected from palladium, platinum, ruthenium, rhodium, iridium or osmium and a chemical component including at least one compound selected from the group consisting of suitable oxometallates and metallic acids. Preferably, the metallic component comprises at least one metal selected from the group consisting of platinum and palladium and the chemical component comprises at least one compound selected from the group consisting of tungstic acid, molybdic acid, ammonium tungstate, ammonium molybdate, sodium tungstate and sodium molybdate. The electrode is operable in fuel cells which employ readily available oxygen or air.

17 Claims, 2 Drawing Sheets

ELECTROCATALYSTS FOR H₂/O₂ FUEL CELLS CATHODE

FIELD OF THE INVENTION

The invention relates to polycomponent electrocatalysts suitable for use at the cathode of electrochemical and fuel cells. More particularly, the invention relates to a polycomponent electrode comprising a catalytic electrode including a mechanical mixture of a group VIII metal from the periodic table, preferably platinum and/or palladium, deposited on a conductive carrier and a chemical component comprising at least one compound selected from the group consisting of suitable oxometallates and metallic acids, preferably tungstic or molybdic acid, ammonium tungstate or molybdate and sodium tungstate or molybdate.

GROUND OF THE INVENTION

Electrochemical devices such as fuel cells are used to obtain direct conversion of hydrogen, hydrocarbon, and oxygen, to a low voltage direct current electricity. A typical fuel cell comprises a fuel electrode or anode, an oxidant electrode or cathode, an electrolyte positioned between the electrodes and means to introduce fuel and oxidant to their respective electrodes. Each electrode is typically comprised of a substrate with a layer of catalyst disposed on the surface which faces the electrolyte.

During operation, a continuous flow of fuel is fed to the anode while, simultaneously, a continuous flow of oxidant is fed to the cathode. The fuel is oxidized at the anode with a release of electrons through the agency of a catalyst. The electrons are then conducted to the cathode through wires external to the cell, where the oxidant is reduced and the electrons are consumed, again through the agency of a catalyst. The constant flow of electrons from the anode to the cathode constitutes an electrical current which can be made to be used for work.

The problems encountered in obtaining an efficient fuel cell are essentially those of electrochemical kinetics. It is necessary that the reactions of the fuel and oxidant occur in such a manner that the amount of energy degraded into heat is as small as possible. At the same time, the reaction rate of the cell must be high enough to produce economically sufficient current from a cell of practical size. For this reason, it is customary to incorporate catalysts into the fuel cell electrode to accelerate the reactions occurring at these electrodes.

There have been many attempts over the years to find inexpensive highly active electrocatalysts and processes for making them. However, the choice of materials is severely limited since any catalyst which is developed for this purpose must not only have a high activity for the electrochemical reduction of oxygen, but must be capable of withstanding a working environment of relatively high temperatures while being exposed to a strong acid.

Initially, catalysts were made of platinum or other noble metals, as these materials were best able to withstand the corrosive environment of the electrochemical cell. Later, these noble metals were dispersed over the surface of electrically conductive supports. For example, the activity per unit mass of a catalyst can be enhanced by supporting it in the form of finely divided particles, upon either metallic or carbonaceous base materials of high surface area. This approach has proved especially useful in cell applications utilizing acid electrolytes, for example, where particulate platinum is dispersed on a conductive support material such as carbon black and the platinum-covered carbon black, mixed with a suitable bonding agent, is applied as a thin layer on a conductive carbon paper or cloth to form an electrode.

It was later discovered that certain alloys of noble metals exhibited increased catalytic activity, further increasing fuel cell efficiencies. In some instances, an increased resistance to sintering and dissolutions in fuel cells and other electrochemical and chemical processes was noted when using alloyed metals rather than unalloyed noble metal catalysts.

The enhanced activity of various platinum transition metal alloys as air catalysts in phosphoric acid fuel cells has been described extensively in the patent literature. All of these catalysts are in the form of metals dispersed on a conductive carbon carrier.

U.S. Pat. Nos. 4,186,110 and 4,202,934 describe platinum alloyed with Ti, V, Mn, Mo and Al, all at concentrations of typically 25–40 atomic percent (a/o). U.S. Pat. Nos. 4,316,944, 4,447,506 and 4,677,092 describe Pt-Cr alloys as being more active than Pt-V alloys and report better lifetimes as well. In fact, U.S. Pat. No. 4,316,944 discloses that in the case of a Pt-V alloy in 99% phosphoric acid at 194° C. and at a potential of 900 my/reference hydrogen electrode, over 67% of the vanadium was dissolved, whereas under the same conditions for a Pt-Cr alloy, only 37% of the chromium had dissolved. However, even with this loss of the alloying constituents, the activity of the alloy cathodes was reported to be higher than pure platinum cathodes containing the same amount of platinum.

U.S. Pat. Nos. 4,447,506 and 4,677,092 describe ternary alloys such as Pt-Cr-Co alloys with discussions on the formation of an ordered ternary phase as the preferred state of this ternary catalyst. At the outset, it has not been determined whether such materials are more active cathode catalysts than pure platinum.

The behaviour of a Pt-Ti catalyst in phosphoric acid at 190° C. has been determined by Beard et al. (J. Electrochem. Soc. 133:18-39, 1986). It was found that surface of the Pt-Ti alloy was very reactive to oxygen at 190° C., causing dealloying in the near surface region and the formation of titanium oxide overlayers.

The behaviour of Pt-Cr alloys in acid electrolyte has also been studied and reported by Daube et al. (J. Vac. Sci. Technol. A, 4:16-17, 1986), and Paffett et al. (J. Electro. Anal. Chem. 220:269, 1987, J. Electro. Chem. Soc. 135:1431, 1988). It was found that Cr was etched from the near surface region when the alloy was used in phosphoric acid at relatively low temperatures. No enhancement in the kinetics of oxygen reduction other than a surface area effect (preferential dissolution of one metal causes an external roughening of the surface of the alloy) was found. It seems clear however that a surface area effect would also exist on small particles and at the relatively high temperatures fuel cell cathodes.

The use in fuel cells of electrodes comprising a Pt-W alloy on a carbon support has been widely described in the prior art. Patents describing Pt-W electrodes include U.S. Pat. Nos. 4,937,220, 4,826,795, 4,822,699, 4,808,563, 4,591,578, 4,513,094, 4,373,014, 4,370,214, 4,192,907 and 3,506,494. However, it seems that the Pt-W loading does not provide substantial differences in electrode performance when compared to other noble metal alloys. Also, it seems that in almost all instances, the Pt loading of the material used in fuel cell cathodes is at least 10% by weight and can be up to 50% by weight. This is a percentage that is relatively high when one considers that even with state-of-the-art technology, systems of this type require 16 g of platinum per kilowatt.

From both a capital and a demand standpoint, it would be desirable to minimize drastically the amount of platinum used in fuel cell power plants. There is therefore a need to develop stable catalysts with increased activity for the electrochemical reduction of oxygen.

SUMMARY OF THE INVENTION

In accordance with the present invention, there is provided a polycomponent electrocatalyst having a metallic component comprising at least one metal selected from the group consisting of palladium, platinum, ruthenium, rhodium, iridium and osmium dispersed on a suitable conductive carrier and a chemical component comprising at least one compound selected from the group consisting of oxometallates and metallic acids.

Preferably, the metallic component comprises at least one metal selected from the group consisting of palladium and platinum and the chemical component is selected from the group consisting of tungstic acid, molybdic acid, ammonium tungstate, ammonium molybdate, sodium tungstate and sodium molybdate. The metal is dispersed on a suitable conductive carrier to form the metallic component and the chemical component is admixed with the metallic component. Preferably, the conductive carrier comprises carbon, more preferably in the form of high surface area graphitized carbon particles. The optimum crystallite size of the graphitized carbon particles can range from about 0.200 to 0.300 micrometers.

The polycomponent electrocatalyst of the present invention can optionally comprise a binder waterproofing agent such as polytetrafluoroethylene.

In the case of a catalyst comprising platinum and tungstic acid, a preferred embodiment is constituted by a Pt/$H_2WO_4$ polycomponent electrocatalyst having a platinum component which represents between 0.1 and 20% by weight of the catalyst and a tungstic acid component which represents between 0.1 and 90% by weight of the catalyst.

With regard to catalysts comprising palladium and/or platinum and ammonium tungstate $((NH_4)_6H_2W_{12}O_{40})$, ammonium molybdate $((NH_4)_6H_2MO_{12}O_{40})$, sodium tungstate $(Na_2WO_4)$ or sodium molybdate $(Na_2MoO_4)$ or a mixture of at least two of the tungstate or molybdate components, preferred embodiments include PD/$(NH_4)_6H_2W_{12}O_{40}$, Pd/$(NH_4)_6H_2Mo_{12}O_{40}$, Pd/$(NH_2)WO_4$, Pd/$Na_2MoO_4$, Pt/$(NH_4)_6H_2W_{12}O_{40}$, Pt/$(NH_4)_6H_2Mo_{12}O_{40}$, Pt/$(NH_2)WO_4$ and Pt/$Na_2MoO_4$ electrocatalysts having a palladium or platinum component representing between 0.1 and 20% by weight of the catalyst and a $(NH_4)_6H_2W_{12}O_{40}$, $(NH_4)_6H_2Mo_{12}O_{40}$, $Na_2WO_4$ or $Na_2MoO_4$ component representing between 0.1 and 90% by weight of the catalyst.

Also within the scope of the present invention is a cathode for use in an electrochemical cell. The cathode comprises a catalytically effective amount of a polycomponent catalyst including a metallic component comprising at least one metal selected from the group consisting of palladium, platinum, ruthenium, rhodium, iridium or osmium dispersed on a suitable conductive carrier and a chemical component comprising at least one compound selected from the group consisting of oxometallates and metallic acids admixed with the metallic component, supported on a support member. Preferably, the metallic component comprises at least one metal selected from the group consisting of palladium and platinum and the chemical component comprises at least one compound selected from the group consisting of tungstic acid, molybdic acid, ammonium tungstate, ammonium molybdate, sodium tungstate or sodium molybdate.

Also within the scope of the present invention is an electrochemical cell comprising a cathode electrode as described above. The cathode electrode comprises a catalytically effective amount of the multicomponent electrocatalyst referred to above supported on a support member. The electrocatalyst includes a metallic component comprising at least one metal selected from the group consisting of palladium, platinum, ruthenium, rhodium, iridium or osmium dispersed on a suitable conductive carrier and a chemical component comprising at least one compound selected from the group consisting of oxometallates and metallic acids admixed with the metallic component. Preferably, the metallic component comprises at least one metal selected from the group consisting of palladium and platinum, and the chemical component comprises at least one compound selected from the group consisting of tungstic acid, molybdic acid, ammonium tungstate, ammonium molybdate, sodium tungstate or sodium molybdate.

Also within the scope of the present invention is a fuel cell. The fuel cell comprises an electrolyte and a cathode electrode. The electrode comprises a catalytically effective amount of the multicomponent electrocatalyst referred to above supported on a support member. Preferably, the electrolyte in the fuel cell is phosphoric acid or potassium hydroxyde.

Also within the scope of the present invention is a fuel cell comprising an anode electrode spaced apart from a cathode electrode having an electrolyte disposed therebetween. The cathode electrode comprises a catalytically effective amount of the multicomponent electrocatalyst referred to above supported on a support member.

The electrocatalysts of the present invention can be used for oxygen reduction in acid electrolytes and/or for hydrogen oxidation in alkaline electrolyte.

An important aspect of the present invention is the fact that the catalyst is a mechanical mixture of the active metal on a conductive carrier with at least one compound selected from the group consisting of oxometallates and metallic acids, rather than a metal-metal alloy such as those conventionally disclosed in the prior art.

X-ray diffraction analysis of electrodes containing various embodiments of the catalyst of the present invention has demonstrated that, in the case of a Pt-$H_2WO_4$ catalyst for example, both platinum and tungstic acid are present as separate entities on the electrode. Pt-W and W-C alloys have not been detected.

In the case of catalysts comprising a palladium or platinum component and at least one chemical component selected from $(NH_4)_6H_2W_{12}O_{40}$, $(NH_4)_2H_2Mo_{12}O_{40}$, $Na_2WO_4$ and $Na_2MoO_4$, X-ray diffraction has shown that the chemical component is detected on the catalyst. Metal-noble metal alloys have not been detected and the catalyst comprises metal-chemical component complexes of the type $Pd-(NH_4)_6H_2W_{12}O_{40}$ or $PD-(NH_4)_6H_2W_{12}O_{40}$.

The catalysts of the present invention can be produced at considerably reduced temperatures when compared to conventional metal-metal alloy catalysts. Also, the mass activity and the exchange current density of the catalyst is usually greater than that of unalloyed metal catalysts. On the other hand, the potential at 0.200 $A/cm^2$ of the polycomponent electrode is usually greater than that of unalloyed metal.

It was also noted that the use of the polycomponent catalytic system of the present invention yields substantially enhanced performances of the overall fuel cell when compared, for example, to the use of single metal catalysts on commercially available oxygen gas or air which is contaminated with carbon monoxide or carbon dioxide.

IN THE DRAWINGS

DETAILED DESCRIPTION OF THE INVENTION

Figure 1:
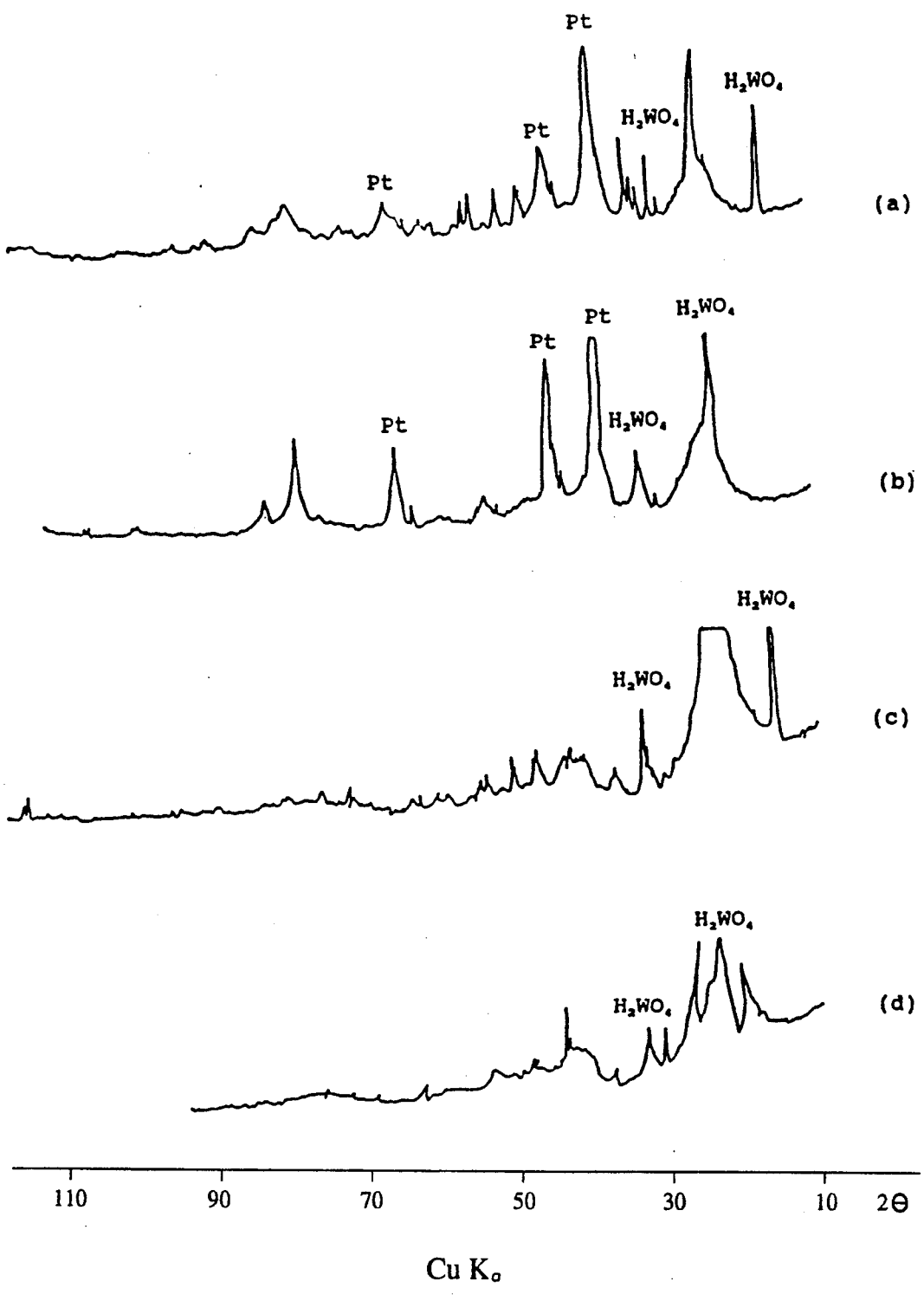
FIG. 1 represents X-ray diffraction patterns for platinum-tungstic acid electrodes produced according to various methods.

The polycomponent electrocatalyst of the present invention can be prepared by a procedure which involves the initial step of depositing at least one metal selected from the group consisting of palladium, platinum, ruthenium, rhodium, iridium and osmium on a conductive carrier to form the metallic component of the electrocatalyst.

Preferably, the conductive carrier, which can be selected from various chemically treated graphite materials which are well-known to those skilled in the art, is mixed with a platinum and/or palladium acid such as chloroplatinum and/or chloropalladium acid. Hot concentrated sodium formate is preferably added to the mixture. There results a coprecipitated electrocatalyst mixture essentially containing active particulate metal deposited on a conductive graphite support.

The amount of metal and graphite support can be adjusted to vary the metal: conductive carrier weight percentage range. For example, in the case of platinum and/or palladium, the platinum and/or palladium: conductive carrier weight percentage range, it can span from 1%:99% to 20%:80% but preferred ranges fall between 10%:90% and 20%:80%.

The conductive carrier and metal source can be mixed at various temperatures. In the case of platinum and/or palladium, this temperature can range from 60° to 90° C. Preferred temperatures vary between 70° and 90° C. with 80° C. being the most preferred. The time required to obtain the desired level of deposition of metal on the conductive carrier varies depending upon the temperature. For example, a minimum time of 30 minutes is required at 80° C. for platinum and/or palladium.

Once the metal has been deposited on the appropriate conductive carrier support, the polycomponent catalyst of the present invention is formed by combining the metal-deposited conductive carrier to chemical components comprising at least one compound selected from the group consisting of suitable oxometallates and metallic acids. The term "suitable oxometallates and metallic acids", when used herein, is to be construed to include any oxometallate and metallic acid that can be used efficiently under the experimental conditions involved in the preparation and industrial operation of the electrocatalysts contemplated in the context of the present invention. Preferred oxometallates and metallic acids include those selected from the group consisting of tungstic acid, molybdic acid ammonium tungstate, ammonium molybdate, sodium tungstate and sodium molybdate.

When tungstic acid and/or molybdic acid are used, the total concentration of tungstic acid and/or molybdic acid can vary from 0.1% to 90% depending on the percentage of tungstic acid and/or molybdic acid desired for the final catalyst. The metal-deposited conductive carrier is mixed with the tungstic acid and/or molybdic acid at room temperature and the electrodes are synthesized at temperatures ranging from 250° to 360° C., with 345° C. being preferred. This synthesis process is referred to in the present application as the heat treatment of the electrodes. A binderwaterproofing agent can be added to the mixture to fix the catalyst more efficiently to its support. Binderwaterproofing agents such as polytetrafluoroethylene (Teflon) are contemplated but it is to be understood by the person skilled in the art that other binderwater- proofing agents can be used.

A wide range of catalyst components can be tolerated in the overall electrode. For instance, there is contemplated utilizing from about 0.1% to 20% platinum and/or palladium and from about 0.1% to 90% of tungstic acid or molybdic acid on a weight basis. It has been found that for superior performance of the overall electrode, a mechanical mixture electrode comprising 2% platinum and 1% of tungstic acid is preferred.

Advantageously, a portion of the platinum and/or palladium components may be substituted by other metallic components such as ruthenium, rhodium, iridium or osmium. However, it is preferred that not more than up to 20% of platinum and/or palladium metal content be substituted by another noble metal.

When ammonium tungstate, ammonium molybdate, sodium tungstate, sodium molybdate or mixtures thereof are used as the chemical component of the catalyst together with a metal selected from palladium and/or platinum, the total concentration of the chemical component varies from 0.1 to 90%, depending on the percentage of the chemical component desired for the final catalyst. The platinum and/or palladium-deposited conductive carrier is mixed with the desired tungstate or molybdate at room temperature and the electrodes are synthesized at temperatures ranging from 250° to 360° C., with 345° C. being preferred. A binderwaterproofing agent can be added to the mixture to fix the catalyst more efficiently to its support. Binderwaterproofing agents such as polytetrafluoroethylene (Teflon) are contemplated but it is to be understood by the person skilled in the art that other binderwaterproofing agents can be used.

Catalysts comprising from about 0.1 to 20% of platinum and/or palladium and from about 0.1 to 90% of $(NH_4)_6H_2W_{12}O_{40}$, $(NH_4)_6H_2Mo_{12}O_{40}$, $Na_2MoO_4$ and $Na_2WO_4$ on a weight basis are preferred. It has been found that for superior performance of the overall electrode, a mechanical mixture electrode comprising 1 to 2% of platinum or palladium and 50% of $(NH_4)_6H_2W_{12}O_{40}$, $(NH_4)_6H_2Mo_{12}O_{40}$, $Na_2WO_4$ or $Na_2MoO_4$ is most preferred.

Advantageously, a portion of platinum and/or palladium may be substituted by other metallic or chemical components such as ruthenium, rhodium, iridium or osmium. However, it is preferred that not more than up to 20% of platinum and/or palladium metal be substituted by another noble metal.

The electrocatalysts formed according to the present invention are structurally different from prior art electrodes comprising metal alloys. In fact, the chemical species identified by X-ray crystallography demonstrate that no alloy is formed between the metal component and the metallic species of the chemical component. Thus, an important aspect of the electrocatalysts of the present invention is in their chemical composition. More particularly, the presence of both a metallic and a chemical component on the surface of the conductive carrier seems to enhance the overall catalytic activity of the electrocatalyst of the present invention.

The following examples are provided to illustrate rather than limit the scope of the present invention.

EXAMPLE 1

Preparation of a carbon support 30 grams of graphitic carbon Vulcan XC-72R were dispersed in 100 ml of a hot solution containing 0.3 grams of copper acetate by ultrasonic blending for 4 hours. The mixture was then agitated and heated in air until water was evaporated, and then heated at 150° C. for 24 hours. The compound was then stirred and passed through a sieve in order to minimize its density. 2 grams of the resulting material was placed into a combustion boat in a quartz tube and heated at 570° C. under nitrogen atmosphere for 15 minutes and then at the same temperature in an oxygen atmosphere for a period varying between 20 and 100 seconds. The resulting material was then cooled at room temperature under a nitrogen atmosphere and weighted. This heating operation was repeated until a weight loss of between 15% and 30% was obtained. The material was then washed with 50% vol $HNO_3$ and then with bidistilled water. It was finally in an oven at 110° C. for 24 hours and passed through a 100 mesh screen to yield only particles of the conductive carbon support.

EXAMPLE 2

Preparation of 10% and 2% platinum and 2% palladium electrocatalysts 10 grams of the carbon support prepared in example 1 were added to a solution consisting of either 2.5 grams or 0.5 grams of chloroplatinic acid (for the 10% and 2% platinum catalyst) or 0.5 of palladium chloride (for the 2% palladium catalyst) in 80 ml bidistilled $H_2O$ boiled and mixed at 80° C. for 30 minutes. After vigorous stirring, 80 ml of a hot saturated solution of sodium formate was added and the mixture was heated at 110° C. for 30 minutes. After filtration of the mixture, the black residue was dried at 110° C. during 24 hours and was passed through a 100 mesh screen. The carbon-supported metallic catalysts thus obtained can be used to elaborate various types of electrocatalysts such as: a) platinum or palladium electrocatalyst, b) platinum or palladiun-tungstic acid polycomponent electrocatalysts as described in Examples 3 and 4, and platinum and palladium-oxometalate electrocatalysts as described in Examples 5 to 8.

Platinum (10% or 2%) or palladium (2%) electrocatalyst electrodes are fabricated by using the above treated black residue to make a teflon bonded electrode through conventional techniques. A gold plated screen was pressed into the electrode to act as an electron collector. The performance of the resulting 10% Pt (sample #1 in Table 1), 2% Pt (sample #2 in Table 1) and 2% Pd (sample #30 in Tables 3 and 5) electrodes in oxygen reduction or hydrogen oxidation is used for comparisons with that of the electrocatalyst electrodes of the invention.

EXAMPLE 3

Preparation of Pt-tungstic acid polycomponent electrocatalysts

The carbon-supported platinum particles obtained in example 2 were mixed with various concentrations of $H_2WO_4$ and with 5.50 mg of Teflon 30. Varying amounts of $H_2WO_4$ were added, namely 0.10; 0.20; 1.00; 2.00; 3.00 and 4.00 mg of $H_2WO_4$ were added to carbon-supported platinum in view to obtain 20 mg of the desired polycomponent catalyst. The mixture was then agitated, evaporated and dried on an aluminium foil. The residue was then pressed at 345° C. using conventional techniques on a gold screen to act as electron collector.

EXAMPLE 4

Performance in phosphoric acid of $Pt/H_2WO_4$ electrocatalysts

The electrocatalysts prepared in example 3 (labelled as samples #3 to 8 for respective $H_2WO_4$ amounts of 0.10; 0.20; 1.00; 2.00; 3.00 and 4.00 mg) were tested to demonstrate their superiority over their binary counterparts (e.g. 10% and 2% platinum catalysts samples #1 and #2) as well as electrodes prepared with $H_2WO_4$ electrocatalysts by adding nominally 0.10; 0.20 and 0.30 mg of $Pt/cm^2$ of carbon supported platinum electrocatalysts. (samples #9, #10 and #11 respectively).

Cathodes prepared from the electrocatalysts of Examples 2 and 3 were tested in 2 $cm^2$ laboratory fuel cells. All the electrodes were tested and the electrocatalytic parameters determined in phosphoric acid. The voltage was also measured at a current density of 0.200 $A/cm^2$. All the electrodes contained the same quantity of platinum weight up to 0.300 mg of $Pt/cm^2$ electrode whereas in the available literature the smallest quantity of noble metal used is 10% of Pt. Each of the catalyst performance was evaluated at standard conditions, i.e. a well current density of 0.200 $A/cm^2$, 180° C. cell temperature with $O_2$ at high flow rate as the reacting gas and with voltage at the given current corrected to eliminate cell ohmic lost (iR-free).

The data (see Tables 1 and 2 for platinum-$H_2WO_4$ catalysts) demonstrate an increase in the catalytic properties for the electrochemical reduction of oxygen in excess of that of the supported unalloyed platinum in phosphoric acid. The results in Tables 1 and 2 also show that the best electrocatalysts are obtained with sample #3 for platinum-$H_2WO_4$ electrocatalysts. On the other hand, it may be seen from Tables 1 and 2 that the BET surface area is not the factor determining the electrodes performances for oxygen reduction. For example, sample #2 and sample #3 have the same BET area but the best electrocatalyst is obtained with sample #3. Furthermore, it may be seen at Table 1 that the $O_2$ activity at 900 mV (Vs DHE) e.g. 50 mA/mg.Pt of sample #3 of the electrode of this invention is higher than that of a Pt-W alloy electrode (e.g. 31 mA/mg.Pt) shown in the literature (see U.S. Pat. No. 4,373,014).

All of the electrocatalysts tested have a ti. thickness of 100-200 μm. However, the thickness used at the surface of practice electrocatalyst fuel cell electrodes is up to $\approx 10$ μm. Hence, it seems that the amount of platinum which can be used in fuel cells for these electrodes could be much smaller than that indicated here.

TABLE 1

Comparison of multicomponent catalysts and unalloyed platinum in a fuel cell at 180° C.

| Sample | Electrocatalysts | Surface area BET m²/g | Activity on $O_2$ at 900 mV mA/mg Pt | Cathodic potential at 0.200 A/cm² mV Vs DHE |
|---|---|---|---|---|
| #1 | 10% Pt | 55 | 11 | 714 |
| #2 | 2% Pt | 100 | 16 | 676 |
| #3 | 2% Pt, 1% $H_2WO_4$ | 102 | 50 | 720 |
| #4 | 2% Pt, 5% $H_2WO_4$ | 93 | 10 | 688 |
| #5 | 2% Pt, 10% $H_2WO_4$ | 92 | 22 | 708 |
| #6 | 2% Pt, 15% $H_2WO_4$ | 78 | 10 | 689 |
| #7 | 2% Pt, 20% $H_2WO_4$ | 76 | 15 | 668 |
| #8 | 2% Pt, 0.5% $H_2WO_4$ | 108 | 11 | 618 |

TABLE 2

Comparison of multicomponent catalysts and unalloyed platinum in a fuel cell at 180° C.

| Sample | Electrocatalysts | Surface area BET m²/g | Activity on $O_2$ at 900 mV mA/mg Pt | Cathodic potential at 0.200 A/cm² mV Vs DHE |
|---|---|---|---|---|
| #1 | 10% Pt | 55 | 11 | 714 |
| #2 | 2% Pt | 100 | 16 | 676 |
| #3 | 2% Pt, 1% $H_2WO_4$ | 102 | 50 | 720 |
| #9 | 1% Pt, 1% $H_2WO_4$ | 105 | 36 | 490 |
| #10 | 3% Pt, 1% $H_2WO_4$ | 104 | 29 | 728 |
| #11 | 9% Pt, 10% $H_2WO_4$ |  | 8 | 641 |

FIG. 1 represents X-ray diffraction patterns for platinum-tungstic acid electrodes having the composition of sample #3 but produced according to various treatments: (a) $H_2WO_4$/Pt/graphite without heat treatment, (b) $H_2WO_4$/Pt/graphite with heat treatment, (c) $H_2WO_4$/graphite without heat treatment and (d) $H_2WO_4$/graphite with heat treatment. As it may be seen in FIG. 1, the X-ray diffraction data of sample #3 at different treatments show that tungstic acid ($H_2WO_4$) and Pt are distinctively detected in both (a) and (b). Also, tungsten (W) or tungsten alloys (e. g. W-C or W-Pt) or tungsten oxide ($WO_3$) were not detected in the electrodes of this invention. This is an important difference between the electrodes of this invention and the metal-metal alloy electrodes described in the art.

EXAMPLE 5

Preparation of Pd-$H_2Mo_{12}O_{40}^{-6}$ polycomponent electrocatalysts

The carbon-supported palladium particles obtained in example 2 were mixed with various concentrations of $(NH_4)_6H_2Mo_{12}O_{40}$ and with 5.50 mg of Teflon 30. Varying amounts of $(NH_4)_6H_2Mo_{12}O_{40}$ were added, namely 1.00; 1.50; 2.50; 5.00 and 6.00 mg of $(NH_4)_6H_2Mo_{12}O_{40}$ were added to 10 mg of carbon-supported palladium. Other Pd-$H_2Mo_{12}O_{40}^{-6}$ catalysts have also been prepared by adding respectively 0.050, 0.100 and 0.150 of Pd/cm² of carbon-supported palladium to 5 mg of $(NH_4)_6H_2Mo_{12}O_{40}$ to yield 10 mg of electrocatalyst. The mixture was then agitated, evaporated and heated at 345° C. on an aluminium foil. The residue was then pressed using conventional techniques on a platinum screen to act as electron collector. All the resulting electrodes contained the same quantity of palladium weight, i.e. 0.100 mg of Pd/cm² electrode. Pt-$Na_2WO_4$ electrodes were also produced following the same procedure.

EXAMPLE 6

Performance of hydrogen oxidation in potassium hydroxide for Pd-$H_2Mo_{12}O_{40}^{-6}$ electrocatalysts Each of the catalyst performance was evaluated at standard conditions i.e. a well current density of 0.200 A cm⁻², 80° C. cell temperature with $H_2$ at high flow rate as the reacting gas and with voltage at the given current corrected to eliminate cell ohmic loss (iR-free). The data (see Tables 3 and 4 for palladium—$(NH_4)_6H_2Mo_{12}O_{40}$ catalysts) demonstrate an increase in the catalytic activity exchange current density for the electrochemical oxidation of hydrogen when compared to the supported unalloyed 10% platinum and unalloyed 2% palladium. Tables 3 and 4 show that the best electrocatalysts are obtained with sample #18 for the palladium—$(NH_4)_6H_2Mo_{12}O_{40}$ electrocatalysts. All these electrocatalysts have a thickness of 100-200 μm. However the thickness used at the surface of practice electrocatalyst fuel cell electrodes is up to ~10 μm. Thus, it seems that the amount of palladium which can be used in fuel cells of these electrodes could be at least 10 times smaller than that indicated here.

TABLE 3

Electrocatalytic parameters for $H_2$ 100% oxydation in KOH 7M at 80° C.

| Catalyst |  | Surface area BET | Exchange current density ($i_o$ mA·cm⁻²) | Tafel slope (b mV/decade) | $H_2$ iR free cell voltage at 80° C. and 0.200 mA·cm⁻² in mV/SCE |
|---|---|---|---|---|---|
| Pt 10% - standard | #1 | 55 | 9.30 | 90 | 950 |
| Pd 2% - standard | #30 | 100 | 1.0 | 400 | 500 |
| Pd 3% - $H_2Mo_{12}O_{40}^{-6}$ 10% | #12 | 98 | 12.5 | 400 | 700 |
| Pd 3% - $H_2Mo_{12}O_{40}^{-6}$ 15% | #13 | 102 | 8.0 | 260 | 750 |
| Pd 3% - $H_2Mo_{12}O_{40}^{-6}$ 25% | #14 | 104 | 9.0 | 150 | 800 |
| Pd 3% - $H_2Mo_{12}O_{40}^{-6}$ 50% | #15 | 105 | 12.5 | 130 | 1000 |
| Pd 3% - $H_2Mo_{12}O_{40}^{-6}$ 60% | #16 | 100 | 0.9 | 400 | 450 |

TABLE 4

Electrocatalytic parameters for $H_2$ oxydation in KOH 7M at 80° C.

| Catalyst | | | Surface area BET | Exchange current density ($i_o$ mA·cm$^{-2}$) | Tafel slope (b mV/decade) | $H_2$ iR free cell voltage (mV/SCE) 0.200 A·cm$^{-2}$ |
|---|---|---|---|---|---|---|
| Pd 1% - $H_2Mo_{12}O_{40}^{-6}$ | 50% | #17 | 100 | 11.50 | 130 | 950 |
| Pd 2% - $H_2Mo_{12}O_{40}^{-6}$ | 50% | #18 | 105 | 20 | 150 | 1150 |
| Pd 3% - $H_2Mo_{12}O_{40}^{-6}$ | 50% | #19 | 105 | 10.5 | 130 | 1000 |

EXAMPLE 7

Preparation of Pd-$H_2W_{12}O_{40}^{-6}$ polycomponent electrocatalysts

The carbon-supported palladium particles obtained in example 2 were mixed with various concentrations of $(NH_4)_6H_2W_{12}O_{40}$ and with 5.50 mgs of Teflon 30. Varying amounts of $(NH_4)_6H_2W_{12}O_{40}$ were added, namely 0.10; 0.40; 1.00; 2.00 and 4.00 mgs of $(NH_4)_6H_2W_{12}O_{40}$ were added to 20 mg of carbon-supported palladium. Other Pd-$H_2W_{12}O_{40}$ catalysts have also been prepared by adding respectively 0.025, 0.050, 0.100 and 0.150 mg of Pd/cm$^2$ carbon-supported palladium to 5 mg of $(NH_4)_6H_2W_{12}O_{40}$. The mixture was then agitated, evaporated and dried on an aluminium foil. The residue was then pressed using conventional techniques on a platinum screen to act as electron collector. All the resulting electrodes contained the same quantity of palladium weight, i.e. 0.100 mg of Pd/cm$^2$ electrode.

Cathodes were made from mixtures described in Example 7, and tested in 2 cm$^2$ laboratory fuel cells. All the electrodes were run and the electrocatalytic parameters determined. Each of the catalyst performance was evaluated at standard conditions i.e. a well current density of 0.200 A cm$^{-2}$, 180° C. cell temperature with $O_2$ at high flow rate as the reacting gas and with voltage at the given current corrected to eliminate cell ohmic lost (iR-free). The mass activity of the cathode catalyst e.g. the maximum current available (in ma/mg of noble metal) due to oxygen reduction was also determined. The data (see Tables 5 and 6 for palladium—$(NH_4)_6H_2W_{12}O_{40}$ catalysts) demonstrate an increase in the catalytic activity for electrochemical reduction of oxygen when compared to the supported unalloyed 10% platinum and the supported unalloyed 2% palladium. The results in Tables 5 and 6 also show that the best electrocatalysts are obtained with sample #21 for the palladium—$(NH_4)_6H_2W_{12}O_{40}$ electrocatalysts.

TABLE 5

Electrocatalytic parameters for oxygen reduction in $H_3PO_4$ 100% at 180° C.

| Catalyst | | | Surface area BET | Electrode activity at 900 mV/D.H.E. (mA/mg of Pt) | Tafel slope (b mV/decade) | Cell iR free cell voltage at 0.200 mA·cm$^{-2}$ |
|---|---|---|---|---|---|---|
| Pt 10% - standard | | #1 | 55 | 11 | 150 | 714 |
| Pd 2% - standard | | #30 | 100 | 5 | 150 | 675 |
| Pd 2% - $H_2W_{12}O_{40}^{-6}$ | .5% | #20 | 98 | 10 | 150 | 668 |
| Pd 2% - $H_2W_{12}O_{40}^{-6}$ | 2% | #21 | 100 | 50 | 150 | 740 |
| Pd 2% - $H_2W_{12}O_{40}^{-6}$ | 10% | #22 | 105 | 8 | 220 | 708 |
| Pd 2% - $H_2W_{12}O_{40}^{-6}$ | 20% | #23 | 101 | 5 | 240 | 688 |
| Pd 2% - $H_2W_{12}O_{40}^{-6}$ | 20% | #24 | 102 | 6 | 250 | 620 |

TABLE 6

Electrocatalytic parameters for oxygen reduction in $H_3PO_4$ 100% at 180° C.

| Catalyst | | | Surface area BET | Electrode activity at 900 mV/D.H.E. (mA/mg of Pt) | Tafel slope (b mV/decade) | Cell iR free voltage at −0.200 A·cm$^{-2}$ |
|---|---|---|---|---|---|---|
| Pd 0.5% - $H_2W_{12}O_{40}^{-6}$ | 2% | #25 | 101 | 10 | 170 | 690 |
| Pd 1% - $H_2W_{12}O_{40}^{-6}$ | 2% | #26 | 102 | 15 | 160 | 700 |
| Pd 2% - $H_2W_{12}O_{40}^{-6}$ | 2% | #21 | 100 | 50 | 150 | 740 |
| Pd 3% - $H_2W_{12}O_{40}^{-6}$ | 2% | #27 | 105 | 20 | 190 | 680 |

EXAMPLE 8

Performance of oxygen reduction in phosphoric acid for Pd-$H_2W_{12}O_{40}^{-6}$ electrocatalysts All the electrocatalysts of Example 7 have a thickness of 100-200 μm. Further, as it was the case in Example 6, the quantity of palladium can be much smaller than that indicated here. The electrocatalysts of Example 7 were also tested to demonstrate their superiority over their respective binary counterparts (e.g. electrodes prepared with palladium and without $(NH_4)_6 H_2W_{12}O_{40}$).

It may also be seen from Tables 3 to 6 that the BET surface area is not a factor determining the electrodes hydrogen oxidation and oxygen reduction. For example, sample #1 and sample #21 have the same BET surface area but the electrode activity for the oxygen reduction is better for sample #21 than that of sample #1. Analogous results were obtained for the palladium—$Na_2WO_4$ platinum—$(NH_4)_6H_2W_{12}O_{40}$ or platinum—$Na_2WO_4$ electrocatalysts.

Figure 2:
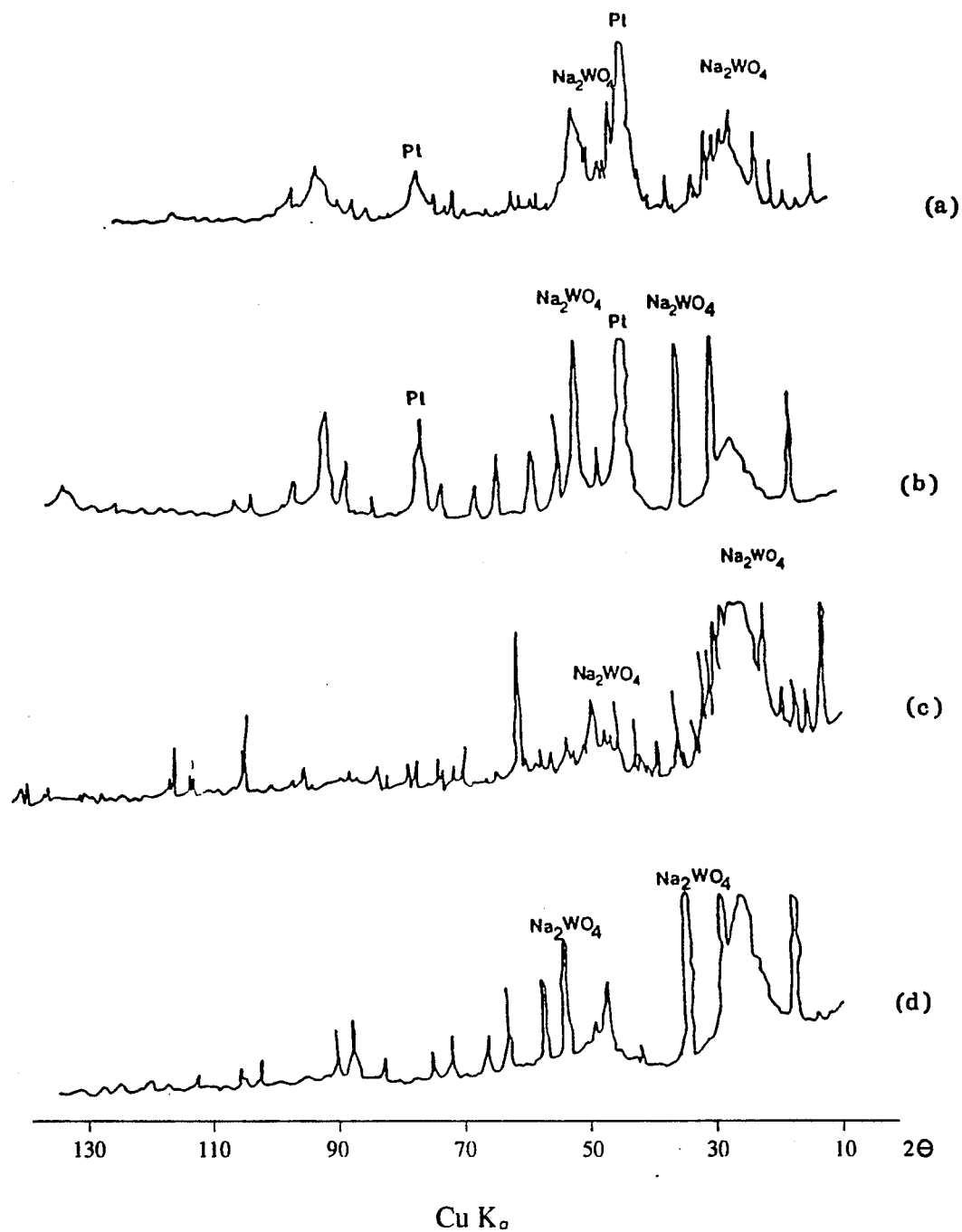
FIG. 2 represents X-ray diffraction patterns for platinum-sodium tungstate electrodes produced according to various methods.

The difference of electrode performance seems to be related to their chemical composition and this is shown by X-ray diffraction data. FIG. 2 represents X-ray diffraction patterns for platinum-sodium tungstate electrodes produced according to various treatments: (a) $Na_2WO_4$/Pt/graphite without heat treatment, (b) $Na_2WO_4$/Pt/graphite with heat treatment, (c) $Na_2WO_4$/graphite without heat treatment and (d) $Na_2WO_4$/graphite with heat treatment. X-ray diffraction data demonstrates that Pt and $Na_2WO_4$ are distinctively detected in both samples (a) and (b) while no tungsten (w) or tungsten alloys such as W-C or W-Pt were detected. Analogous results were obtained on other electrodes; e.g. Pd or Pt and $(NH_4)_6H_2W_{12}O_{40}$, $(NH_4)_6H_2Mo_{12}O_{40}$, $Na_2WO_4$ or $Na_2MoO_4$ were distinctly detected by X-ray diffraction analysis in the corresponding polycomponent elaborated material. electrodes but also as electrocatalysts in the chemical, pharmaceutical, automotive and anti-pollution fields.

The electrocatalysts of this invention have particular utility as electrodes for the reduction of oxygen. Their activity renders them particularly suitable in phosphoric acid fuel cells. However, they can be used in sulfuric acid fuel cell e.g. solid polymer fuel cells. They can be used in alkaline fuel cells. On the other hand, their use is not limited to a fuel cell and they can be used in any environment where electrochemical oxygen reduction takes place as part of the process, e.g. in a metal or battery or electrochemical probe. Although the invention was shown and described with respect to detailed embodiments there of, it should be understood by those skilled in the art that various changes and omissions may be made therein without departing from the spirit and scope of the invention.

We claim:

1. A polycomponent electrocatalyst, comprising a metallic component comprising at least one metal selected from the group consisting of platinum, palladium, ruthenium, rhodium, iridium and osmium dispersed on a suitable conductive carrier and wherein said chemical component comprises at least one compound selected from the group consisting of tungstic acid, molybdic acid, ammonium tungstate, ammonium molybdate, sodium tungstate or sodium molybdate, said metallic component being mechanically admixed with said chemical component.

2. The polycomponent electrocatalyst according to claim 1, wherein said conductive carrier comprises conductive carbon.

3. The polycomponent electrocatalyst according to claim 2, wherein said conductive carbon is in the form of high surface area graphitized carbon particles.

4. The polycomponent electrocatalyst according to claim 3, wherein the crystallite size of said graphitized carbon particles ranges from about 0.200 to 0.300 micrometers.

5. The polycomponent electrocatalyst according to claim 1, wherein said metal is platinum and represents between 0.1 and 20% by weight of said catalyst and wherein said chemical component is tungstic acid and represents between 0.1 and 90% by weight of said catalyst.

6. The polycomponent electrocatalyst according to claim 5, wherein platinum represents 2% by weight of said catalyst and tungstic acid and represents 1% by weight of said catalyst.

7. The polycomponent electrocatalyst according to claim 1, wherein said metal is platinum and represents between 0.1 and 20% by weight of said catalyst and wherein said chemical component is selected from the group consisting of ammonium tungstate, ammonium molybdate, sodium tungstate and sodium molybdate and represents between 0.1 and 90% by weight of said catalyst.

8. The polycomponent electrocatalyst according to claim 1, wherein said metal is palladium and represents between 0.1 and 20% by weight of said catalyst and wherein said chemical component is selected from the group consisting of ammonium tungstate, ammonium molybdate, sodium tungstate and sodium molybdate and represents between 0.1 and 90% by weight of said catalyst.

9. The polycomponent electrocatalyst according to claim 7, wherein platinum represents between 1 and 2% by weight of said catalyst and $(NH_4)_6H_2W_{12}O_{40}$, $(NH_4)_6H_2Mo_{12}O_{40}$, $Na_2WO_4$ or $Na_2MoO_4$ represent about 50% by weight of said catalyst.

10. The polycomponent electrocatalyst according to claim 8, wherein palladium represents between 1 and 2% by weight of said catalyst and $(NH_4)_6H_2W_{12}O_{40}$, $(NH_4)_6H_2Mo_{12}O_{40}$, $Na_2WO_4$ or $Na_2MoO_4$ represent about 50% by weight of said catalyst.

11. The polycomponent electrocatalyst according to claim 1, further comprising a binder waterproofing agent.

12. The polycomponent electrocatalyst according to claim 11, wherein said binder waterproofing agent is polytetrafluoroethylene.

13. A cathode for use in an electrochemical cell, said cathode comprising a catalytically effective amount of a polycomponent electrocatalyst supported on a support member, said electrocatalyst comprising a metallic component comprising at least one metal selected from the group consisting of platinum, palladium, ruthenium, rhodium, iridium and osmium dispersed on a suitable conductive carrier and at least one chemical component selected from the group consisting of tungstic acid, molybdic acid, ammonium tungstate, ammonium molybdate, sodium tungstate or sodium molybdate, said metallic component being mechanically admixed with said chemical component.

14. An electrochemical cell, comprising a cathode electrode, which comprises a catalytically effective amount of a multicomponent electrocatalyst supported on a support member, said electrocatalyst comprising at least one metal selected from the group consisting of platinum, palladium, ruthenium, rhodium, iridium and osmium dispersed on a suitable conductive carrier and a chemical component consisting of tungstic acid, molybdic acid, ammonium tungstate, ammonium molybdate, sodium tungstate or sodium molybdate, said metallic component being mechanically admixed with said chemical component.

15. A fuel cell, comprising an electrolyte and a cathode electrode, said electrode comprising a catalytically effective amount of a multicomponent electrocatalyst supported on a support member, said catalyst comprising a metallic component comprising at least one metal selected from the group consisting at least one metal selected from the group consisting of platinum, palladium, ruthenium, rhodium, iridium and osmium dispersed on a suitable conductive carrier and a chemical component comprising at least one compound selected from the group consisting of tungstic acid, molybdic acid, ammonium molybdate, sodium tungstate or sodium molybdate, said metallic component being mechanically admixed with said chemical component.

16. A fuel according to claim 15, wherein said electrolyte is phosphoric acid.

17. A fuel cell, comprising an anode electrode spaced apart from a cathode electrode having an electrolyte dispersed therebetween, said cathode electrode comprising a catalytically effective amount of a multicomponent electrocatalyst supported on a support member, said catalyst comprising a metallic component comprising at least one metal selected from the group consisting of tungstic acid, molybdic acid, ammonium tungstate, sodium tungstate or sodium molybdate, said metallic component being mechanically admixed with said chemical component.

* * * * *